United States Patent
Li et al.

(10) Patent No.: US 12,212,702 B2
(45) Date of Patent: Jan. 28, 2025

(54) ROLLING DISPLAY HANDSET ARCHITECTURE WITH TORSION SPRING

(71) Applicant: Huawei Technologies Co., Ltd., Shenzhen (CN)

(72) Inventors: Jue Li, Helsinki (FI); Xueqiang Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 334 days.

(21) Appl. No.: 17/795,339

(22) PCT Filed: Jan. 27, 2020

(86) PCT No.: PCT/EP2020/051870
§ 371 (c)(1),
(2) Date: Jul. 26, 2022

(87) PCT Pub. No.: WO2021/151458
PCT Pub. Date: Aug. 5, 2021

(65) Prior Publication Data
US 2023/0090143 A1 Mar. 23, 2023

(51) Int. Cl.
*H04M 1/02* (2006.01)
*G06F 1/16* (2006.01)

(52) U.S. Cl.
CPC ........ *H04M 1/0268* (2013.01); *G06F 1/1652* (2013.01); *G06F 1/1679* (2013.01); *H04M 1/0216* (2013.01)

(58) Field of Classification Search
CPC ............ H04M 1/0268; H04M 1/0216; H04M 1/0237; H04M 1/0269; G06F 1/1652; G06F 1/1679; G06F 1/1624
See application file for complete search history.

(56) References Cited

U.S. PATENT DOCUMENTS

| | | | |
|---|---|---|---|
| 10,691,172 B2 | 6/2020 | Jovanovic | |
| 11,842,659 B2 * | 12/2023 | Khachatryan | ......... G06F 1/1652 |
| 2005/0041012 A1 | 2/2005 | Daniel et al. | |
| 2017/0212556 A1 | 7/2017 | Jovanovic | |

(Continued)

FOREIGN PATENT DOCUMENTS

| | | |
|---|---|---|
| CN | 204790697 U | 11/2015 |
| CN | 106663392 A | 5/2017 |

(Continued)

*Primary Examiner* — Abhishek M Rathod
(74) *Attorney, Agent, or Firm* — SLATER MATSIL, LLP (57) ABSTRACT

A rolling display mechanism, including a frame supporting a display screen having a retractable portion, a first rack along the upper edge of the frame and mechanically connected to the retractable portion, a second rack along the lower edge of the frame and mechanically connected to the retractable portion, at least one torsion spring extending between the upper and lower edge of the frame, where each torsion spring of the at least one torsion spring is a helical torsion spring, a first pinion mechanically connected to the at least one torsion spring and configured to drive the first rack linearly, and a second pinion mechanically connected to the at least one torsion spring and configured to drive the second rack linearly, where rotation of the first and second pinions is transferred to in-plane movement of the retractable portion.

12 Claims, 5 Drawing Sheets

(56) References Cited

U.S. PATENT DOCUMENTS

2017/0329369 A1   11/2017  Takayanagi et al.
2019/0324501 A1   10/2019  Kim et al.
2020/0363841 A1*  11/2020  Kim ..................... G06F 1/1652

FOREIGN PATENT DOCUMENTS

| EP | 3564783 A1 | 11/2019 |
|----|------------|---------|
| JP | 2008160759 A | 7/2008 |
| WO | 2018006763 A1 | 1/2018 |
| WO | 2018120134 A1 | 7/2018 |

\* cited by examiner

ROLLING DISPLAY HANDSET ARCHITECTURE WITH TORSION SPRING

CROSS REFERENCE TO RELATED APPLICATIONS

This application is a national stage of International Application No. PCT/EP2020/051870, filed on Jan. 27, 2020, which is hereby incorporated by reference in its entirety.

TECHNICAL FIELD

The present invention, in some embodiments thereof, relates to a mechanism for retracting and extending a retractable portion of a display screen and, more specifically, but not exclusively, to a retractable electronic display screen that is extended and retracted by a rack-and-pinion system acting in concert with a torsion spring.

BACKGROUND

Portable electronic devices, such as smart phones or tablets, have display screens. Typically, the display screen is fixed within a frame and occupies a fixed surface area.

Recently, electronic devices have been developed with display screens that are extendible and retractable (hereinafter, retractable screens). Electronic devices with foldable screens have also been developed.

One of the challenges facing the development of retractable screens is the implementation of a suitable extension and retraction mechanism. Conventional mechanisms for extension and retraction of retractable screens have a large number of moving components, such as motorized rollers. The mechanisms may also require extensions of the frame for supporting the extended display screen. Such extension mechanisms are power-inefficient, and make the electronic device complex, bulky, and expensive.

SUMMARY

It is an object of the present invention to provide a mechanism for extending and retracting a display screen that is power-efficient and compact.

The foregoing and other objects are achieved by the features of the independent claims. Further implementation forms are apparent from the dependent claims, the description and the figures.

According to a first implementation, a mechanism for retracting and extending a retractable portion of a display screen comprises a frame supporting the display screen and comprising an upper and a lower edge. A first rack is configured along the upper edge of the frame and is mechanically connected to the retractable portion. A second rack is configured along the lower edge of the frame and is mechanically connected to the retractable portion. At least one helical torsion spring extends between the upper and the lower edge of the frame. A first pinion is mechanically connected to the at least one torsion spring and is configured to drive the first rack linearly, and a second pinion is mechanically connected to the at least one torsion spring and is configured to drive the second rack linearly, such that rotation of the first and second pinions is transferred to in-plane movement of the retractable portion. When the retractable portion of the screen is retracted, the first and second pinions are rotated in a direction that increases a potential energy in the at least one helical torsion spring, and when the retractable portion of the screen is extended, the first and second pinions are rotated in a direction that decreases the potential energy in the at least one helical torsion spring.

Advantageously, the display screen is extended and retracted with a purely mechanical rack-and-pinion system, without requiring any motorized parts. In addition, the rack-and-pinion system and the torsion spring are integrated, so that retraction of the display screen automatically supplies the energy for subsequent extension of the display screen, without requiring supply of any additional energy.

In another implementation according to the first aspect, the mechanism includes at least one stopper locking rotation of the pinions when the retractable portion is retracted. Advantageously, the stopper maintains the screen in place without requiring constant application of manual force.

In another implementation according to the first aspect, upon release of the at least one stopper, the retractable portion is ejected automatically due to release of potential energy from the torsion spring. Advantageously, the automatic ejection mechanism is intuitive and easy to use. In addition, the force for the ejection comes from the potential energy stored in the torsion spring during the retraction of the screen, and thus does not require motorized force or substantial effort by a user.

In another implementation according to the first aspect, the at least one torsion spring comprises at least two helical torsion springs joined by a grounding section, wherein, for each of the at least two helical torsion springs, a first end is attached to a pinion, and a second end is attached to the grounding section. Advantageously, a design with multiple torsion springs may permit a configuration that requires less space for the at least one torsion spring within the frame of the device, allowing for different configurations of electronic components within the frame.

In another implementation according to the first aspect, when the retractable portion is extended, the entire display screen is configured facing a first direction, and, when the retractable portion is retracted, the retractable portion of the display screen remains configured facing the first direction, and a non-retractable portion is configured facing a second direction. Advantageously, the arrangement of a portion of the screen facing the second direction when the retractable portion is retracted allows the screen to wrap around the frame, thereby allowing the screen to occupy less space.

In another implementation according to the first aspect, the display screen is part of a smart phone, tablet, or smart television device. Advantageously, the mechanism is usable to enhance screen size for these devices.

According to a second aspect, a method of retracting and extending a retractable portion of a display screen is disclosed. The display screen is supported by a frame comprising an upper and a lower edge. A first rack is configured along the upper edge of the frame and is mechanically connected to the retractable portion. A second rack is configured along the lower edge of the frame and is mechanically connected to the retractable portion. At least one helical torsion spring extends between the upper and lower edges of the frame. A first pinion is mechanically connected to the at least one torsion spring and is configured to drive the first rack linearly, and a second pinion is mechanically connected to the at least one torsion spring and is configured to drive the second rack linearly, such that rotation of the first and second pinions is transferred to in-plane movement of the retractable portion. The method comprises: retracting the retractable portion of the screen while rotating the first and second pinions in a direction that increases a potential energy in the at least one helical torsion spring, and extending the retractable portion of the screen while rotating the first and second pinions in a direction that decreases the potential energy in the at least one helical torsion spring.

Advantageously, the extending and retracting steps are performed with a purely mechanical rack-and-pinion system, without requiring any motorized parts. In addition, the rack-and-pinion system and the torsion spring are integrated, so that retraction of the display screen automatically supplies the energy for subsequent extension of the display screen, without requiring supply of any additional energy.

In another implementation according to the second aspect, the method further comprises, after the first moving step, engaging at least one stopper for locking rotation of the pinions. Advantageously, the stopper maintains the screen in place without requiring constant application of manual force.

In another implementation according to the second aspect, the method further comprises releasing the at least one stopper and thereby automatically ejecting the retractable portion due to release of potential energy from the torsion spring. Advantageously, the automatic ejection is intuitive and easy to use. In addition, the force for the ejection comes from the potential energy stored in the torsion spring during the retraction of the screen, and thus does not require motorized force or substantial effort by a user.

In another implementation according to the second aspect, the at least one torsion spring comprises at least two helical torsion springs joined by a grounding section, wherein, for each of the at least two helical torsion springs, a first end is attached to a pinion, and a second end is attached to the grounding section. Advantageously, a design with multiple torsion springs may permit a configuration that requires less space for the at least one torsion spring within the frame of the device, allowing for different configurations of electronic components within the frame.

In another implementation according to the second aspect, when the retractable portion is extended, the entire display screen is configured facing a first direction, and, when the retractable portion is retracted, the retractable portion of the display screen remains configured facing the first direction, and a non-retractable portion is configured facing a second direction. Advantageously, the arrangement of a portion of the screen facing the second direction when the retractable portion is retracted allows the screen to wrap around the frame, thereby allowing the screen to occupy less space.

In another implementation according to the second aspect, the display screen is part of a smart phone, tablet, or smart television device. Advantageously, the mechanism is usable to enhance screen size for these devices.

According to a third aspect, a method of assembling a display screen with a retractable portion is disclosed. The method comprises: mounting the display screen onto a frame comprising an upper edge and a lower edge; configuring a first rack that is mechanically connected to the retractable portion along an upper edge of the frame, and configuring a second rack that is mechanically connected to the retractable portion along a lower edge of the frame; extending at least one helical torsion spring between upper and lower edges of the frame; and mechanically connecting first and second pinions to the at least one torsion spring, and configuring the first pinion to drive the first rack linearly, and the second pinion to drive the second rack linearly, such that rotation of the first and second pinions is transferred to in-plane movement of the retractable portion. When the retractable portion of the screen is retracted, the first and second pinions are rotated in a direction that increases a potential energy in the at least one helical torsion spring, and when the retractable portion of the screen is extended, the first and second pinions are rotated in a direction that decreases the potential energy in the at least one helical torsion spring.

Advantageously, a display screen assembled according to the disclosed method is extended and retracted with a purely mechanical rack-and-pinion system, without requiring any motorized parts. In addition, the rack-and-pinion system and the torsion spring are integrated, so that retraction of the display screen automatically supplies the energy for subsequent extension of the display screen, without requiring supply of any additional energy.

In another implementation according to the third aspect, the method further comprises further comprises installing at least one stopper for locking rotation of the pinions when the retractable portion is retracted. Advantageously, the stopper maintains the screen in place without requiring constant application of manual force.

In another implementation according to the third aspect, the at least one torsion spring comprises at least two helical torsion springs joined by a grounding section, wherein, for each of the at least two helical torsion springs, the step of configuring at least one torsion spring comprises attaching a first end to a pinion, and a second end to the grounding section. Advantageously, a design with multiple torsion springs may permit a configuration that requires less space for the at least one torsion spring within the frame of the device, allowing for different configurations of electronic components within the frame.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF ILLUSTRATIVE EMBODIMENTS

The present invention, in some embodiments thereof, relates to a mechanism for retracting and extending a retractable portion of a display screen and, more specifically, but not exclusively, to a retractable electronic display screen that is extended and retracted by a rack-and-pinion system acting in concert with a torsion spring.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIGS. 1A-2B. Device 10 includes a retractable display screen 12. Device 10 may be any device that has a display screen, such as a smart phone, tablet, or smart television device.

Display screen 12 is supported on a frame 14. Frame 14 includes two parallel supports 22. One support 22 is configured along an upper edge 21 of the frame 14, and a second support 22 is configured along a lower edge 23 of the frame 14. The terms upper edge 21 and lower edge 23 are used to describe opposing edges. Since the device 10 may be held in any direction, either of supports 22 may be an upper edge 21, or a lower edge 23. For purposes of illustration, upper edge 21 is depicted adjacent to cameras 20, which would usually be upright when the device is held by a user, and lower edge 23 is depicted on the opposing edge. Helical torsion spring 24, roller 26, and stopper 15 are not visible in FIGS. 1A-2B, but their locations are indicated. The supports 22, torsion spring 24, roller 26, and stopper 15 are part of a mechanism for retracting and extending the retractable portion 16, in a manner that will be described further herein.

Figure 1A:
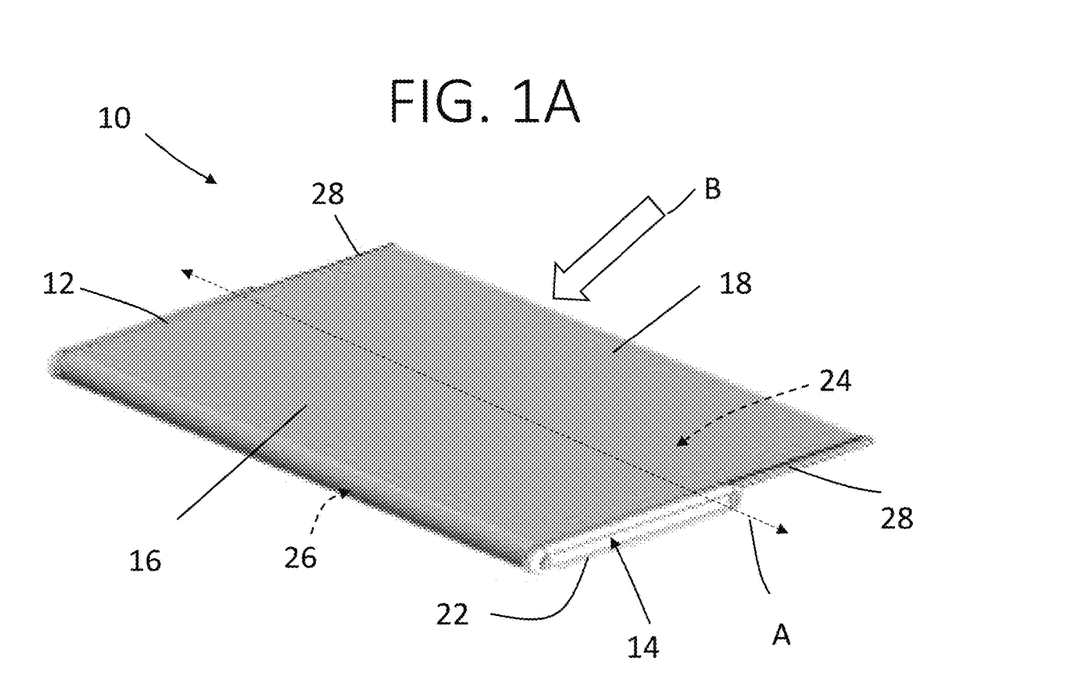
FIG. 1A is a top perspective view of a device with a retractable display screen with the display screen in an extended position, according to embodiments of the invention.
Figure 1B:
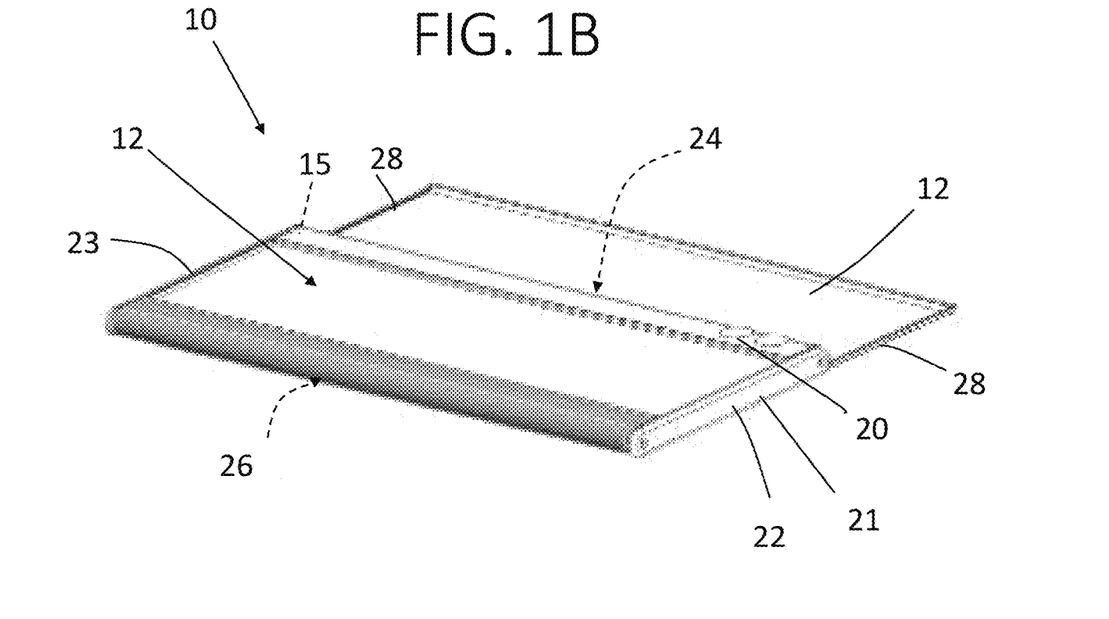
FIG. 1B is a bottom perspective view of the device of FIG. 1A.
Figure 2A:
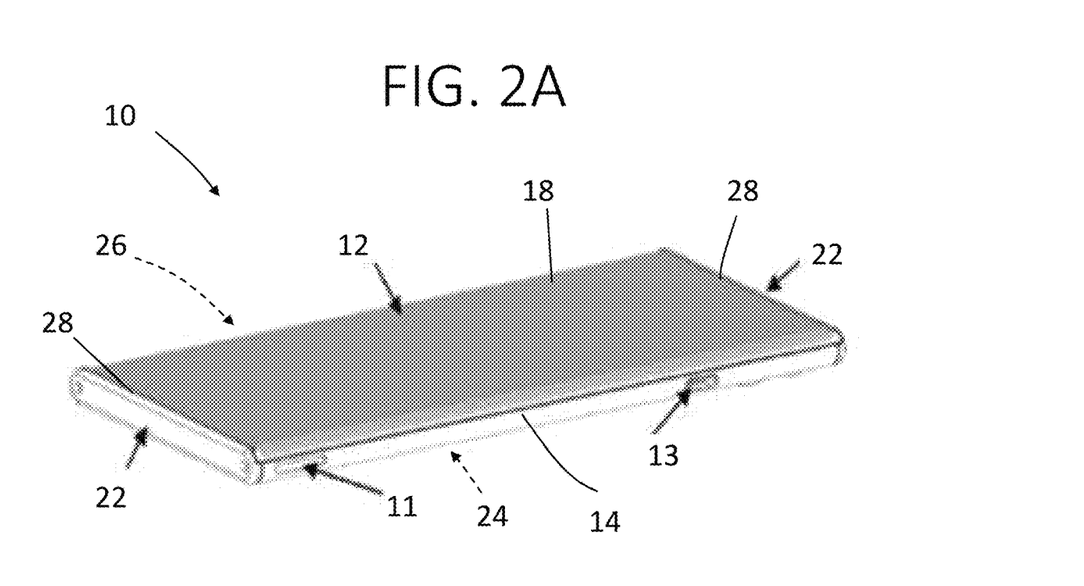
FIG. 2A is a top perspective view of the device of FIG. 1A with the display screen in a retracted position, according to embodiments of the invention.
Figure 2B:
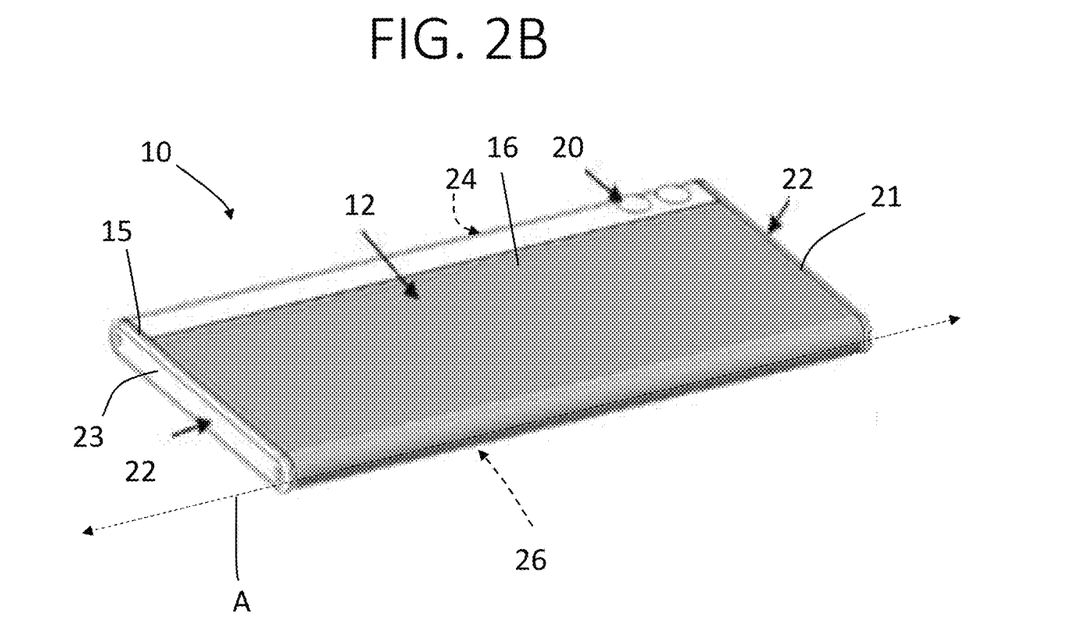
FIG. 2B is a bottom perspective view of the device of FIG. 2A.

In FIGS. 1A and 1B, the retractable display screen 12 is in an extended position. In the extended position, the entire screen 12 is visible from one side of the device 10, referred to herein as the front of the device 10. In FIGS. 2A and 2B, the retractable display screen 12 is in a retracted position. In the retracted position, only portion 18 of the display screen is visible from the front of the device 10, and portion 16 of the display screen is visible from the rear of the device 10. Axis A depicts the dividing point between portion 18 and portion 16 of the display screen 12. The term "retractable portion" refers to portion 18, which is retracted or extended using the system described herein. Portion 16 is referred to herein as the non-retractable portion, because portion 16 moves only ancillary to movement of the retractable portion 18. The direction of retraction is indicated by arrow B in FIG. 1A.

As seen in FIG. 2A, frame 14 also includes user interfaces 11, 13, for controlling features of device 10. User interfaces 11, 13 may be depressible buttons. User interface 11 may control a release of stopper 15 for extending the display screen 12, as will be explained further herein. User interface 13 may be an on/off switch for the device 10. The frame 14 may also include other components typically included in the electronic device 10, such as one or more cameras 20.

As seen best in FIGS. 1A and 1B, racks 28 are mechanically connected to the retractable portion 18 of the screen. When the screen 12 is supported within the frame 14, racks 28 are configured along the upper edge and lower edge of the frame 14, respectively.

Figure 3:
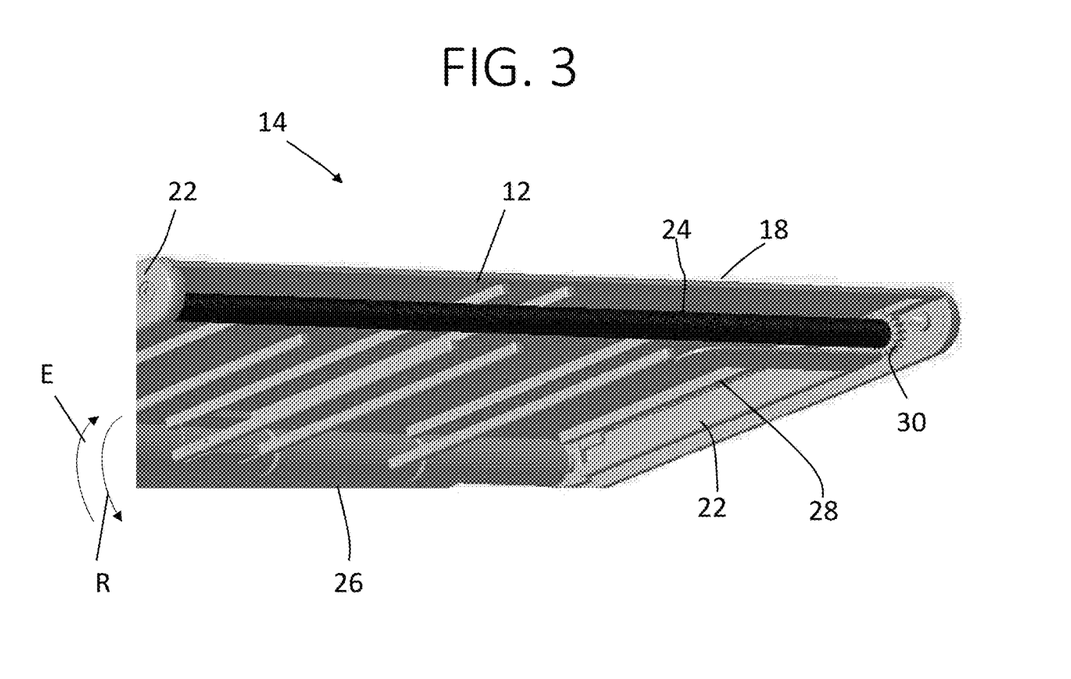
FIG. 3 depicts a mechanism for retracting and extending a retractable portion of the display screen of the device of FIG. 1A.
Figure 4:
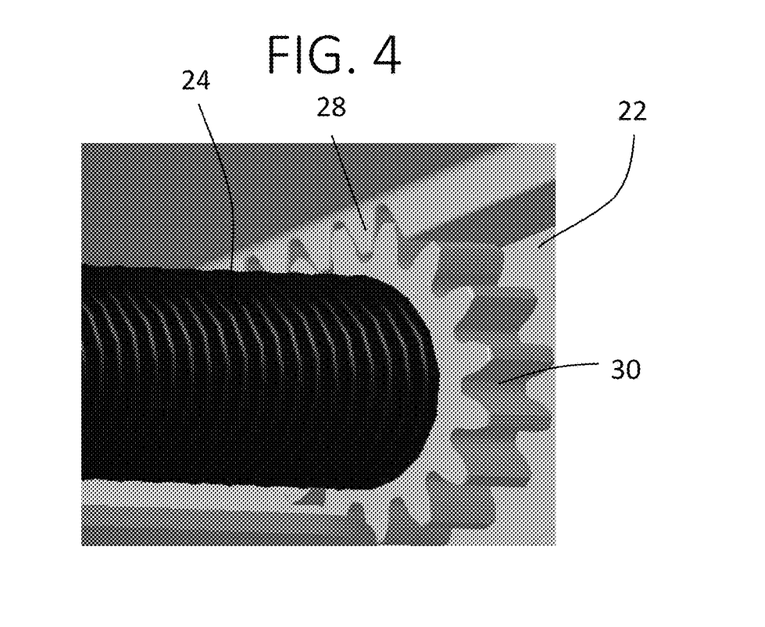
FIG. 4 depicts a close-up view of certain elements of the mechanism of FIG. 3.

Referring now to FIGS. 3 and 4, the mechanism for retracting and extending retractable portion 16 is shown in detail. As seen in FIG. 3, helical torsion spring 24 extends between the upper and lower edges of the frame 14. The length of the torsion spring 24 is selected so that each end of the torsion spring 24 attaches to an upper or lower edge, respectively, of the frame 14. Pinions 30 are mechanically connected to the torsion spring 24 and are configured to rotate along the racks 28. The pinions 30 have gear teeth that cooperate with the racks 28 in a rack-and-pinion system, in a manner known to those of skill in the art. Rotation of the pinions 30 is thus transferred to in-plane movement of the retractable portion 18.

To retract the screen 12, a user pushes the retractable portion 18 in the direction of arrow B in FIG. 1A, for example, with a finger. The non-retractable portion 16 (not shown in FIG. 3) curls in the direction of arrow R around roller 26 until it assumes the position of FIGS. 2A and 2B. Simultaneously, the movement of rack 28 causes pinions 30 to rotate. This rotation of the pinions 30 causes an increase in potential energy of the torsion spring 24.

The user continues to push the retractable portion 18 until the retractable portion 18 is completely retracted. At this point, stopper 15 (not shown in FIG. 3) engages one or both pinions 30, and/or the retractable screen 12, to prevent further rotation of the pinions 30 and fix the screen 12 in the retracted position. Stopper 15 may take any form suitable for fixing the screen 12. For example, stopper 15 may be a rod that is removably inserted between the teeth of pinions 30 when the screen 12 is completely retracted. Optionally, the stopper 15 may include a mechanical actuator which is automatically engaged by the screen 12 itself, when the screen 12 is fully retracted. Stopper 15 may also be manually actuated, such as with push button 11. The location of the stopper 15 is highly dependent on the detailed architecture design of the device 10, and can vary according to design needs for other architectural elements.

To extend the retractable portion, the user releases the stopper 15, for example, by pushing push button 11. The release of the stopper 15 allows the potential energy stored in the torsion spring 24 to be discharged through rotation of the torsion spring 24. The rotation of torsion spring 24, in turn, causes the pinions 30 to rotate. The rotation of the pinions 30 is translated to in-plane movement of the rack 28, which causes retractable portion 18 to extend outward, until the position of FIGS. 1A and 1B is attained again.

Advantageously, the mechanism for expanding and retracting the screen 12 disclosed herein utilizes a small number of moving parts. This allows the device 10 to be constructed in a compact and simple fashion. In addition, the use of the torsion spring 24 makes the mechanism entirely reliant on mechanical forces, without requiring use of motors. In addition, the rack-and-pinion system and the torsion spring are integrated, so that retraction of the display screen automatically supplies the energy for subsequent extension of the display screen, without requiring supply of any additional energy.

Figure 5:
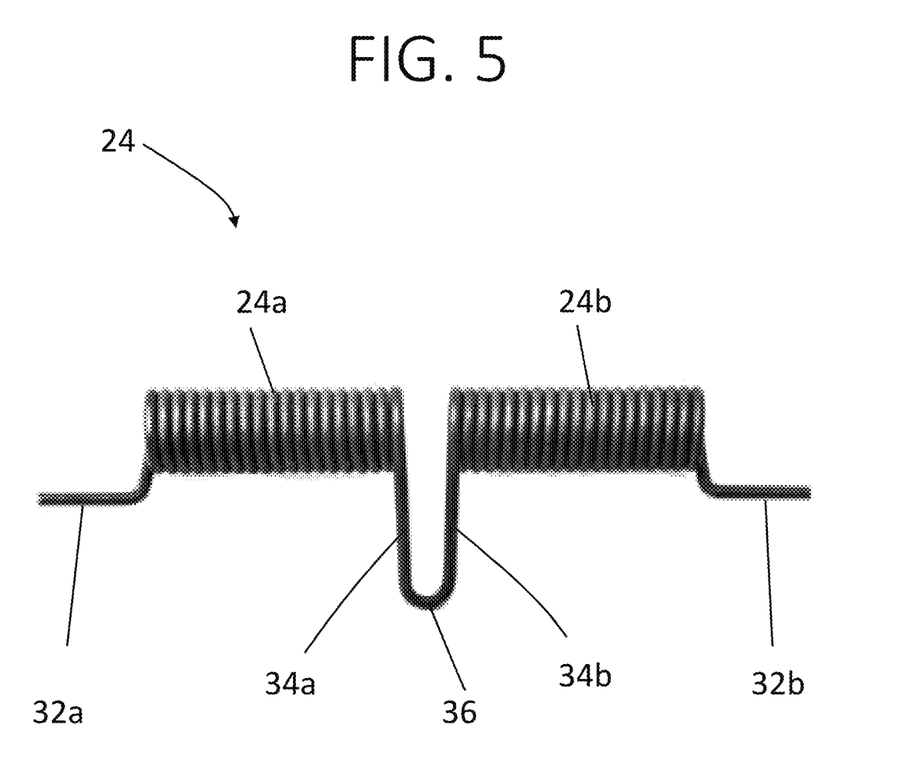
FIG. 5 depicts a double torsion spring usable in the mechanism of FIG. 3, according to embodiments of the invention.

Referring now to FIG. 5, helical torsion spring 24 may include two torsion springs 24a, 24b, joined by grounding section 36. Each of the torsion springs 24a, 24b has, respectively, a first end 32a, 32b attached to a pinion, and a second end 34a, 34b, attached to the grounding section. The two helical torsion springs 24a, 24b may, in combination, function mechanically similarly to a single torsion spring 24. An advantage of using two helical torsion springs 24a, 24b, is that the grounding 36 takes up less space than torsion spring 24, and thus frees up space for inclusion of other components of device 10. The number of torsion springs used in the device 10 may be determined by detailed antenna design and the clearance needed by other components of the device. Thus, more than two torsion springs 24 may also be used in device 10.

The physical parameters of spring 24, such as material, diameter, number of coils, and the like, may be engineered to meet requirements of roll and unroll speed and feeling. In one exemplary embodiment, the spring is made of music wire. Preferably, the music wire complies with the parameters of ASTM standard A228/A228M, for Steel Wire and Music Spring Quality. In one exemplary embodiment, the minimum tensile strength of the music wire spring material is around $318 \times 10^3$ psi, which corresponds to 2192 MPa. The Design Stress may be less than 45% of Minimum Tensile, which is 986 MPa.

Similarly, the physical parameters of the pinions 30 and forces exerted thereby may be engineered according to desired size and feeling requirements. In one exemplary embodiment, the pinions rotate three times during a rolling or unrolling process. The length of each round is 16.5 mm. The gear pitch radius may be 2.5 mm. The intermittent torque may be 35 mNm (milli-Newton meters), and the intermittent force, calculated as intermittent torque divided by gear pitch radius, may be 14 N. The continuous torque may be 25 mNm, so that the continuous force, calculated as continuous torque divided by gear pitch radius, is 10 N.

Figure 6:
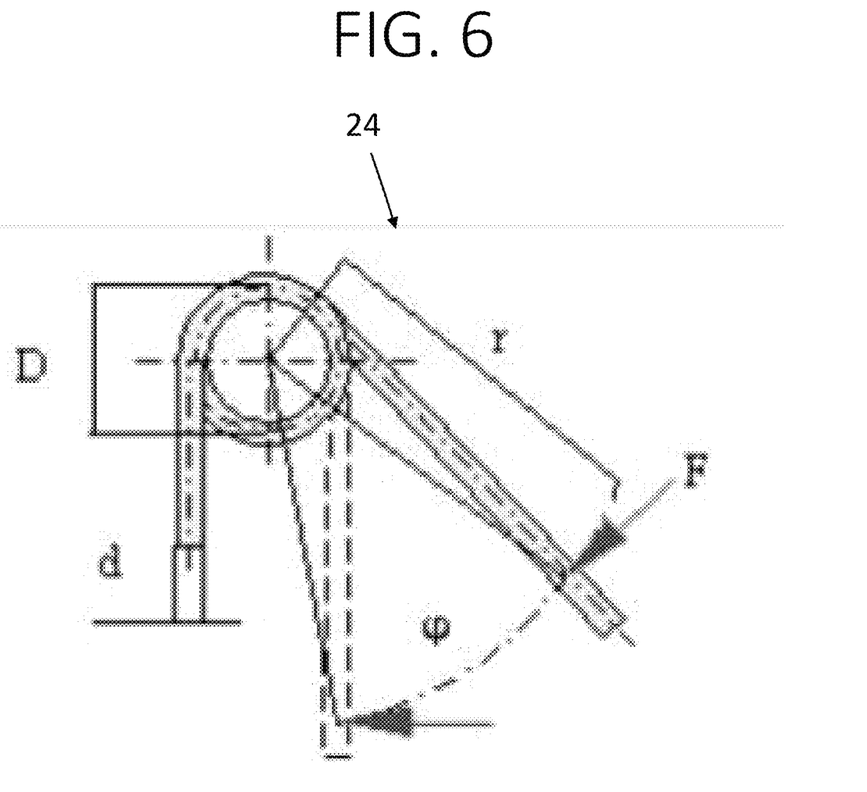
FIG. 6 depicts parameters regarding the torque and angles associated with a torsion spring when it is rotated, according to embodiments of the invention

FIG. 6 illustrates certain physical parameters of torsion spring 24, as the spring 24 is subjected to increased bending stress when the screen 12 is moved from the extended position to the retracted position. Arrow F in FIG. 6 represents an increase in force as the spring is moved along deflection angle φ. The change in deflection angle φ is shown as a dot-dash line. The output force F exerted on the spring is calculated based on the following equation:

$$F = \frac{\pi}{32} \frac{d^3}{r} \sigma$$

where d is the diameter of the spring (as illustrated in FIG. 6), r is the spring length (as illustrated in FIG. 6), and σ is the bending stress. The deflection angle φ is determined by the following equation:

$$\varphi = \frac{2D\pi n}{Ed} \sigma \frac{180}{\pi}$$

where D is the mean coil diameter (as illustrated in FIG. 6), E is the Young's modulus, d is the diameter of the spring wire, and σ is the bending stress.

As can be seen from these equations, for a given spring in which the spring diameter, mean coil diameter, Young's modulus, and spring length r are fixed, the angle φ and the force F are both linearly dependent on the bending stress σ. In one exemplary spring, the diameter d is $0.73 \times 10^{-3}$ m, the mean coil diameter D is $5.27 \times 10^{-3}$ m, the spring length r is $2.5 \times 10^{-3}$ m, and the Young's modulus is $207 \times 10^9$ Pa. In addition, in an exemplary embodiment, the number of active coils n may be 100, and the total spring length is $73 \times 10^{-3}$ m (spring diameter d×number of active coils n). Following the above-referenced formulas, when the preload bending stress σ (also known as preload deflection) is $3.27 \times 10^6$ Pa, the output force F is 5 N, and the spring deflection φ is 410.92 degrees. When the bending stress σ is increased to $1178.27 \times 10^6$ Pa, the output force is increased to 18 N, and the spring deflection φ is increased to 1479.33 degrees.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant devices having display screens will be developed and the scope of the terms device and display screen is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A mechanism, comprising:
a frame supporting a display screen having a retractable portion, the frame comprising an upper edge and a lower edge;
a first rack configured along the upper edge of the frame and mechanically connected to the retractable portion;
a second rack configured along the lower edge of the frame and mechanically connected to the retractable portion;
at least one torsion spring extending between the upper and the lower edge of the frame, wherein each torsion spring of the at least one torsion spring is a helical torsion spring;
a first pinion mechanically connected to the at least one torsion spring and configured to drive the first rack linearly; and
a second pinion mechanically connected to the at least one torsion spring and configured to drive the second rack linearly, such that rotation of the first and second pinions is transferred to in-plane movement of the retractable portion;
wherein the first pinion and second pinion are each arranged to be rotated in a first direction that increases a potential energy in the at least one helical torsion spring in response to the retractable portion of the screen being retracted, and wherein the first and second pinions are arranged to be rotated in a second direction that decreases the potential energy in the at least one helical torsion spring in response to the retractable portion of the screen being extended; and
wherein the at least one torsion spring comprises at least two helical torsion springs joined by a grounding section, and wherein, each of the at least two helical torsion springs has a first end attached to a pinion of the first pinion and second pinion, and further has a second end attached to the grounding section.

2. The mechanism of claim 1, further comprising at least one stopper configured for locking rotation of the pinions when the retractable portion is retracted.

3. The mechanism of claim 2, wherein, upon release of the at least one stopper, the retractable portion is ejected automatically due to release of potential energy from the torsion spring.

4. The mechanism of claim 1, wherein the entire display screen is configured to face a first direction when the retractable portion is extended, wherein the retractable portion of the display screen is configured to remain facing the first direction when the retractable portion is retracted, and wherein a non-retractable portion is configured to face a second direction when the retractable portion is retracted.

5. The mechanism of claim 1, wherein the display screen is part of at least one of a phone, a tablet, or a television device.

6. A method, comprising:
retracting a retractable portion of a display screen while rotating a first pinion and second pinion in a direction that increases a potential energy in at least one helical torsion spring, wherein the display screen is supported by a frame comprising an upper edge and a lower edge, a first rack is configured along the upper edge of the frame and is mechanically connected to the retractable portion, wherein a second rack is configured along the lower ede of the frame and is mechanically connected to the retractable portion, wherein the at least one helical torsion spring extends between the upper and lower edges of the frame, wherein the first pinion is mechanically connected to the at least one helical torsion spring and is configured to drive the first rack linearly, wherein the second pinion is mechanically connected to the at least one helical torsion spring and is configured to drive the second rack linearly, such that rotation of the first pinion and second pinions is transferred to in-plane movement of the retractable portion, wherein the at least one helical torsion spring comprises at least two helical torsion springs joined by a grounding section, and wherein, each of the at least two helical torsion springs has a first end attached to a pinion of the first pinion and second pinion, and further has a second end attached to the grounding section; and
extending the retractable portion of a screen while rotating the first and second pinions in a direction that decreases the potential energy in the at least one helical torsion spring.

7. The method of claim 6, further comprising, after the retracting, engaging at least one stopper and locking rotation of the pinions.

8. The method of claim 7, further comprising releasing the at least one stopper and automatically ejecting the retractable portion by release of potential energy from the at least one helical torsion spring.

9. The method of claim 6, wherein the entire display screen is configured to face a first direction when the retractable portion is extended, wherein the retractable portion of the display screen is configured to remain facing the first direction when the retractable portion is retracted, and wherein a non-retractable portion is configured to face a second direction when the retractable portion is retracted.

10. The method of claim 6, wherein the display screen is part of at least one of a phone, a tablet, or a television device.

11. A method of assembling a display screen with a retractable portion, comprising:
   mounting the display screen onto a frame comprising an upper edge and a lower edge;
   configuring a first rack that is mechanically connected to the retractable portion along an upper edge of the frame, and configuring a second rack that is mechanically connected to the retractable portion along a lower edge of the frame;
   extending at least one helical torsion spring between upper and lower edges of the frame, wherein the at least one helical torsion spring comprises at least two helical torsion springs joined by a grounding section;
   mechanically connecting a first pinion and a second pinion to the at least one helical torsion spring by performing, for each of the at least two helical torsion springs, attaching a first end to a pinion of the first pinion and a second pinion, and attaching a second end to the grounding section, and configuring the first pinion to drive the first rack linearly, and further configuring the second pinion to drive the second rack linearly, such that rotation of the first and second pinions is transferred to in-plane movement of the retractable portion;
   wherein, after mechanically connecting the first pinion and second pinion to the at least one helical torsion spring, the first pinion and second pinion are each arranged to be rotated in a first direction that increases a potential energy in the at least one helical torsion spring in response to the retractable portion of the screen being retracted, and wherein, after mechanically connecting the first pinion and second pinion to the at least one helical torsion spring, the first pinion and second pinion are arranged to be rotated in a second direction that decreases the potential energy in the at least one helical torsion spring in response to the retractable portion of the screen being extended.

12. The method of claim 11, further comprising installing at least one stopper configured for locking rotation of the first pinion and second pinion when the retractable portion is retracted.

* * * * *

UNITED STATES PATENT AND TRADEMARK OFFICE
CERTIFICATE OF CORRECTION

PATENT NO. : 12,212,702 B2  
APPLICATION NO. : 17/795339  
DATED : January 28, 2025  
INVENTOR(S) : Li et al.

Page 1 of 1

It is certified that error appears in the above-identified patent and that said Letters Patent is hereby corrected as shown below:

In the Claims

In Column 10, in Claim 6, Line 38, delete "ede" and insert -- edge --.

In Column 11, in Claim 11, Line 25, after "pinion and" delete "a".

Signed and Sealed this  
Sixth Day of May, 2025

Coke Morgan Stewart  
*Acting Director of the United States Patent and Trademark Office*